(12) United States Patent
Chun (10) Patent No.: US 7,102,317 B2
(45) Date of Patent: Sep. 5, 2006

(54) METHOD AND APPARATUS TO PROCESS AN ANALOG ENCODER SIGNAL

(75) Inventor: Young-sun Chun, Yongin si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/038,272

(22) Filed: Jan. 21, 2005

(65) Prior Publication Data

US 2005/0156553 A1    Jul. 21, 2005

(30) Foreign Application Priority Data

Jan. 20, 2004  (KR)  ............ 10-2004-004420
Jan. 18, 2005  (KR)  ............ 10-2005-004446

(51) Int. Cl.
*G05B 19/40* (2006.01)

(52) U.S. Cl. ............ 318/637; 318/560; 318/661; 318/654

(58) Field of Classification Search ........ 318/637, 318/661, 560, 654
See application file for complete search history.

(56) References Cited

U.S. PATENT DOCUMENTS

| | | | | |
|---|---|---|---|---|
| 4,282,468 A | * | 8/1981 | Barker et al. | 318/608 |
| 4,348,627 A | * | 9/1982 | Fulton | 318/807 |
| 4,511,884 A | * | 4/1985 | Serev et al. | 341/116 |
| 4,891,764 A | * | 1/1990 | McIntosh | 700/183 |
| 4,999,558 A | * | 3/1991 | Onodera et al. | 318/685 |
| 5,065,081 A | * | 11/1991 | Shah | 318/638 |
| 5,254,919 A | * | 10/1993 | Bridges et al. | 318/560 |
| 6,188,341 B1 | * | 2/2001 | Taniguchi et al. | 341/116 |
| 6,225,617 B1 | * | 5/2001 | Dandliker et al. | 250/208.2 |
| 6,630,659 B1 | * | 10/2003 | Stridsberg | 250/231.13 |

FOREIGN PATENT DOCUMENTS

| | | |
|---|---|---|
| JP | 62-234422 | 10/1987 |
| JP | 09-005115 | 1/1997 |
| JP | 09-261059 | 10/1997 |
| JP | 2001-308707 | 11/2001 |
| KR | 1989-2314 B1 | 6/1989 |
| KR | 1990-5432 B1 | 7/1990 |
| KR | 2002-58867 A | 7/2002 |

* cited by examiner

*Primary Examiner*—Rita Leykin
(74) *Attorney, Agent, or Firm*—Stanzione & Kim, LLP

(57) ABSTRACT

A method and apparatus to process an analog encoder signal. The apparatus includes an analog encoder pattern generating unit, an analog encoder pattern storage unit, a digital/analog converting unit, a comparing unit, a recent state latch unit, a present state determining unit, and a gray code converting unit. The method includes generating an analog encoder pattern by sampling and quantizing a quasi-sinusoidal wave signal output from an analog encoder during initialization; determining a recent state and a present estimated state by comparing the analog encoder pattern with the quasi-sinusoidal wave signal; and generating quadrature signals from the recent state and the present estimated state.

18 Claims, 6 Drawing Sheets

METHOD AND APPARATUS TO PROCESS AN ANALOG ENCODER SIGNAL

CROSS-REFERENCE TO RELATED APPLICATIONS

This application claims the priority of Korean Patent Application Nos. 10-2004-0004420, filed on, Jan. 20, 2004, and 10-2005-0004446, filed on Jan. 18, 2005 in the Korean Intellectual Property Office, the disclosure of which is incorporated herein by reference in their entirety.

BACKGROUND OF THE INVENTION

1. Field of the Invention

The present general inventive concept relates to a method and apparatus to process an analog encoder signal, and more particularly, to a method and apparatus to process an analog encoder signal, which divides one period of an analog sinusoidal wave signal output from an analog encoder into a predetermined number of states, samples the analog sinusoidal wave signal, compares the analog sinusoidal wave signal with an output signal of the analog encoder, determines a present estimated state based on a recent state, and generates a quadrature signal to control a motor.

2. Description of the Related Art

In recent years, with rapid development in automatic control systems, processing signals output from various sensors is becoming more and more important to realize precise control operations.

Figure 1:
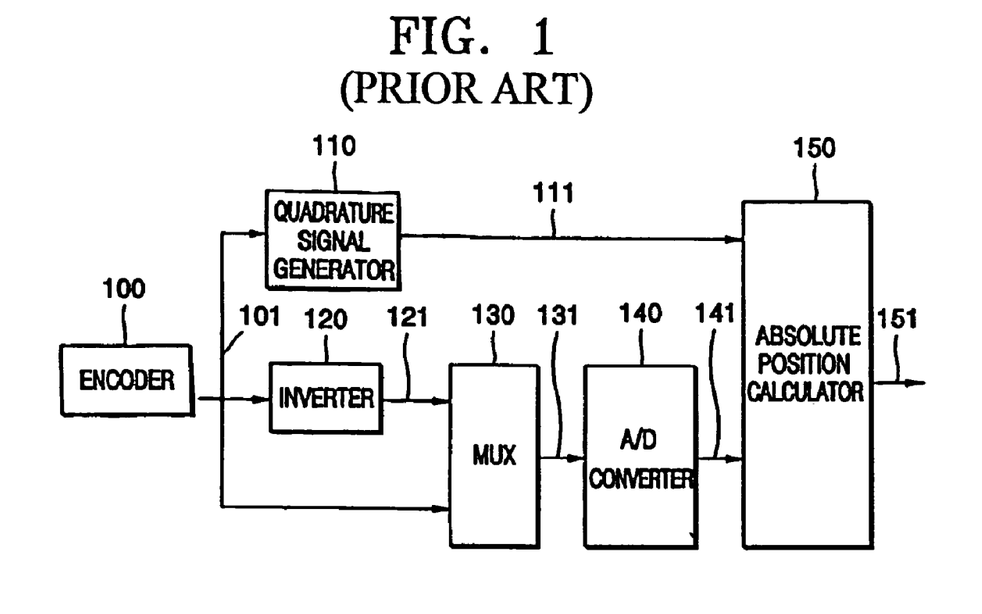
FIG. 1 is a block diagram of a conventional apparatus for calculating a position of a printing paper.

FIG. 1 is a block diagram of a conventional apparatus for calculating a position of a printing paper. The apparatus includes an analog encoder 100, a quadrature signal generator 110, an inverter 120, a multiplexer (MUX) 130, an analog/digital (A/D) converter 140, and an absolute position calculator 150.

Referring to FIG. 1, the analog encoder 100 is connected to an axis of a motor and rotated together with the axis, and outputs two quasi-sinusoidal wave signals, each of which has a predetermined number of periods per rotation of the analog encoder 100, by a phase difference of 90°.

The quadrature signal generator 110 is connected to an output terminal of the encoder 100, receives a quasi-sinusoidal wave signal 101 from the encoder 100, and generates a quadrature signal 111 for obtaining coarse positional information, which is required to divide one period of the output signal into a plurality of states.

The inverter 120 obtains the output signal 101 from the encoder 100 and outputs an inverted output signal 121 of the output signal 101.

The MUX 130 receives the output signal 101, which is a quasi-sinusoidal wave signal, from the encoder 100 and the inverted signal 121 and outputs only one analog signal 131 based on the coarse positional information.

The A/D converter 140 converts the analog signal 131 into a digital signal 141 and transmits the digital signal 141 to the absolute position calculator 150.

The absolute position calculator 150 receives the digital signal 141 output from the A/D converter 140 and the quadrature signal 111 output from the quadrature signal generator 110, obtains the coarse positional information from the digital signal 141 and precise positional information from the digital signal 141, and calculates a precise position of the motor as the motor rotates.

However, in the conventional case, analog/digital (A/D) converted values should be read in short periods to realize a

2 precise control operation. This increases the burden of a central processing unit (CPU).

SUMMARY OF THE INVENTION

The present general inventive concept provides a method and apparatus to process an analog encoder signal, which divides one period of an analog sinusoidal wave signal output from an analog encoder into a predetermined number of states, samples the analog sinusoidal wave signal, compares the analog sinusoidal wave signal with an output signal of the analog encoder, determines a present estimated state from a recent state, and generates a quadrature signal to control a motor.

The present general inventive concept also provides a method and apparatus to process an analog encoder signal, which generates a quadrature signal or obtains positional information without using an analog/digital (A/D) converter.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing an apparatus to process an analog encoder signal, which receives quasi-sinusoidal wave signals fed back from an analog encoder to generate quadrature signals to control a position of a printing paper. The apparatus to process an analog encoder signal may include: an analog encoder pattern generating unit to receive a first quasi-sinusoidal wave signal and a second quasi-sinusoidal wave signal, which are fed back from the analog encoder during initialization, sampling the first quasi-sinusoidal wave signal and the second quasi-sinusoidal wave signal, and generating a sampled analog encoder pattern; an analog encoder pattern storage unit to store the sampled analog encoder pattern generated from the analog encoder pattern generating unit and to transmit a value of the sampled analog encoder pattern corresponding to a recent state input from a recent state latch unit to a digital/analog converting unit; the digital/analog converting unit to convert the value of the sampled analog encoder pattern read from the analog encoder pattern storage unit into an analog value; a comparing unit to compare an output signal of the digital/analog converting unit with an output signal of the analog encoder to generate positional change state information; a recent state latch unit to latch a present estimated state transmitted from a present state determining unit with reference to a reference clock signal, to set the present estimated state as a recent state, and to transmit the recent state to the analog encoder pattern storage unit and the present state determining unit; and a present state determining unit to receive the positional change state information generated from the comparing unit and the recent state read from the recent state latch unit to determine a present estimated state.

The apparatus may further include a gray code converting unit to convert the present estimated state and the recent state into gray codes to generate quadrature signals.

The analog encoder pattern storage unit, the comparing unit, the recent state latch unit, the present state determining unit, and the gray code converting unit may be integrated in a single chip.

The digital/analog converting unit may include a first digital/analog converter to convert a sampled first quasi-sinusoidal wave signal input from the analog encoder pattern storage unit into an analog signal; and a second digital/ analog converter to convert a sampled second quasi-sinusoidal wave signal input from the analog encoder pattern storage unit into an analog signal.

The comparing unit may include a first comparator to compare the first quasi-sinusoidal wave signal output from the first digital/analog converter with the first quasi-sinusoidal wave signal output from the analog encoder; and a second comparator to compare the second quasi-sinusoidal wave signal output from the first digital/analog converter with the second quasi-sinusoidal wave signal output from the analog encoder.

The foregoing and/or other aspects and advantages of the present general inventive concept may also be achieved by providing a method of processing an analog encoder signal, in which an analog quasi-sinusoidal wave signal output from an analog encoder is divided into a predetermined number of states, sampled, stored, and compared with an output signal of the analog encoder, a present estimated state is determined based on a recent state, and quadrature signals to control a motor are generated. The method includes generating an analog encoder pattern by sampling and quantizing a quasi-sinusoidal wave signal output from the analog encoder during initialization; determining a recent state and a present estimated state by comparing the analog encoder pattern with the quasi-sinusoidal wave signal; and generating the quadrature signals based on the recent state and the present estimated state.

The generating of the analog encoder pattern may include generating an analog encoder pattern by sampling a quasi-sinusoidal wave signal and quantizing the sampled quasi-sinusoidal wave signal during initialization, and storing the analog encoder pattern.

The determining of the recent state and the present estimated state may include converting the analog encoder pattern into an analog signal, generating positional change state information by comparing the converted analog signal with the quasi-sinusoidal wave signal output from the analog encoder, and determining a present estimated state based on the positional change state information and the recent state of the analog encoder.

The generating of the quadrature signals may include generating the quadrature signals based on the recent state and the present estimated state with reference to a lookup table.

The generating of the quadrature signals may include generating the quadrature signals based on a state information code including information on the quadrature signals.

The foregoing and/or other aspects and advantages of the present general inventive concept may also be achieved by providing a method of processing an analog encoder signal, in which a quasi-sinusoidal wave signal output from an analog encoder is sampled and stored, a recent state and a present estimated state are determined by comparing the quasi-sinusoidal wave signal with an signal output from the analog encoder, and positional information of a motor is calculated using the recent state and the present estimated state. The method may include generating an analog encoder pattern by quantizing a quasi-sinusoidal wave signal output from the analog encoder during initialization; determining the recent state and the present estimated state by comparing the analog encoder pattern with the quasi-sinusoidal wave signal, and calculating the positional information of the motor using the present estimated state.

The generating of the analog encoder pattern may include generating an analog encoder pattern by sampling a quasi-sinusoidal wave signal and quantizing the sampled quasi-sinusoidal wave signal during initialization, and storing the analog encoder pattern.

The determining of the recent state and the present estimated state may include converting the analog encoder pattern into an analog signal, generating positional change state information by comparing the converted analog signal with the quasi-sinusoidal wave signal output from the analog encoder, and determining a present estimated state based on the positional change state information and the recent state of the analog encoder.

The calculating of the positional information of the motor may include obtaining the positional information of the motor from state values of the recent state and the present estimated state.

As described above, one period of an analog sinusoidal wave signal output from an analog encoder is divided into a predetermined number of states, and the analog sinusoidal wave signal is sampled and compared with an output signal of the analog encoder. Thus, a present estimated state is determined from a recent state, and a quadrature signal to control a motor or positional change state information can be generated.

Also, a quadrature signal can be generated or positional change state information can be obtained without a conventional analog/digital converter.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
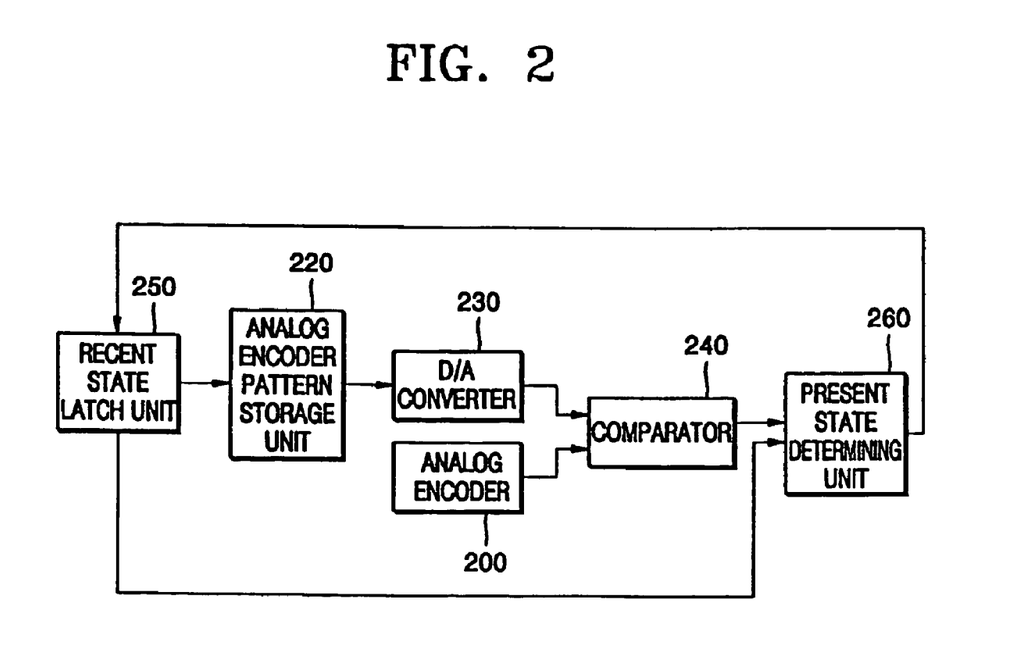
FIG. 2 is a block diagram of an apparatus according to an embodiment of the present general inventive concept.

FIG. 2 is a block diagram of an apparatus to process an analog encoder signal. The apparatus of FIG. 2 includes an analog encoder 200, an analog encoder pattern storage unit 220, a digital/analog converter 230, a comparator 240, a recent state latch unit 250, and a present state determining unit 260.

The analog encoder 200 rotates with and is coupled with an axis of a motor, and outputs a predetermined number of pairs of quasi-sinusoidal signals each having a phase difference of 90 degrees per one turn. The analog encoder pattern storage unit 220 performs sampling on the output of the analog encoder 200 and stores the analog encoder pattern. The analog encoder pattern storage unit 220 also outputs an analog encoder pattern value which corresponds to a recent state inputted from the recent state latch unit 250. The digital/analog converter 230 converts the analog encoder pattern value received from the analog encoder pattern storage unit 220 into an analog form.

Then, the comparator 240 compares the output of the digital/analog converter 230 with the output of the analog encoder 200 and generates positional change state information. The positional change state information will be explained in detail while referring to FIG. 3 and FIG 4.

The positional change state information generated in the comparator 240 is transferred to the present state determining unit 260. The present state determining unit 260 determines a present estimated state by using the output of the comparing unit 240 and the output of the recent state latch unit 250. The determined present estimated state is fed-back to the recent state latch unit 250. Then, the recent state latch unit 250 latches the present estimated state transferred from the present state determining unit 260 as a recent state, and transfers the latched present state to the analog encoder pattern storage unit 220 and the present state determining unit 260.

As stated above, the quasi-sinusoidal output signals from the analog encoder 200 are fed-back to generate quadrature signals used to control the rotation of the motor, so the robustness of the analog encoder 200 to a disturbance and a precision of the controlling of the motor are improved.

The analog encoder signal processing apparatus in FIG. 2 can also include an analog encoder pattern generating unit (not shown) which receives an output signal including the first and second quasi-sinusoidal output signals from the analog encoder 200 and performs sampling on the received signals to generate the sampled analog encoder pattern. With the analog encoder pattern provided, generated analog encoder patterns are stored in the analog encoder pattern storage unit 220.

Driving signals used to drive the motor are generated by using the present estimated state or the recent state. It is possible that quadrature signals which generate a maximum torque for the motor are used as the driving signals. In addition, the driving signals can be generated by converting the present estimated state and the recent state to gray codes, or by using a look-up table representing a relation of the present estimated state and the recent state to the driving signals.

Figure 3:
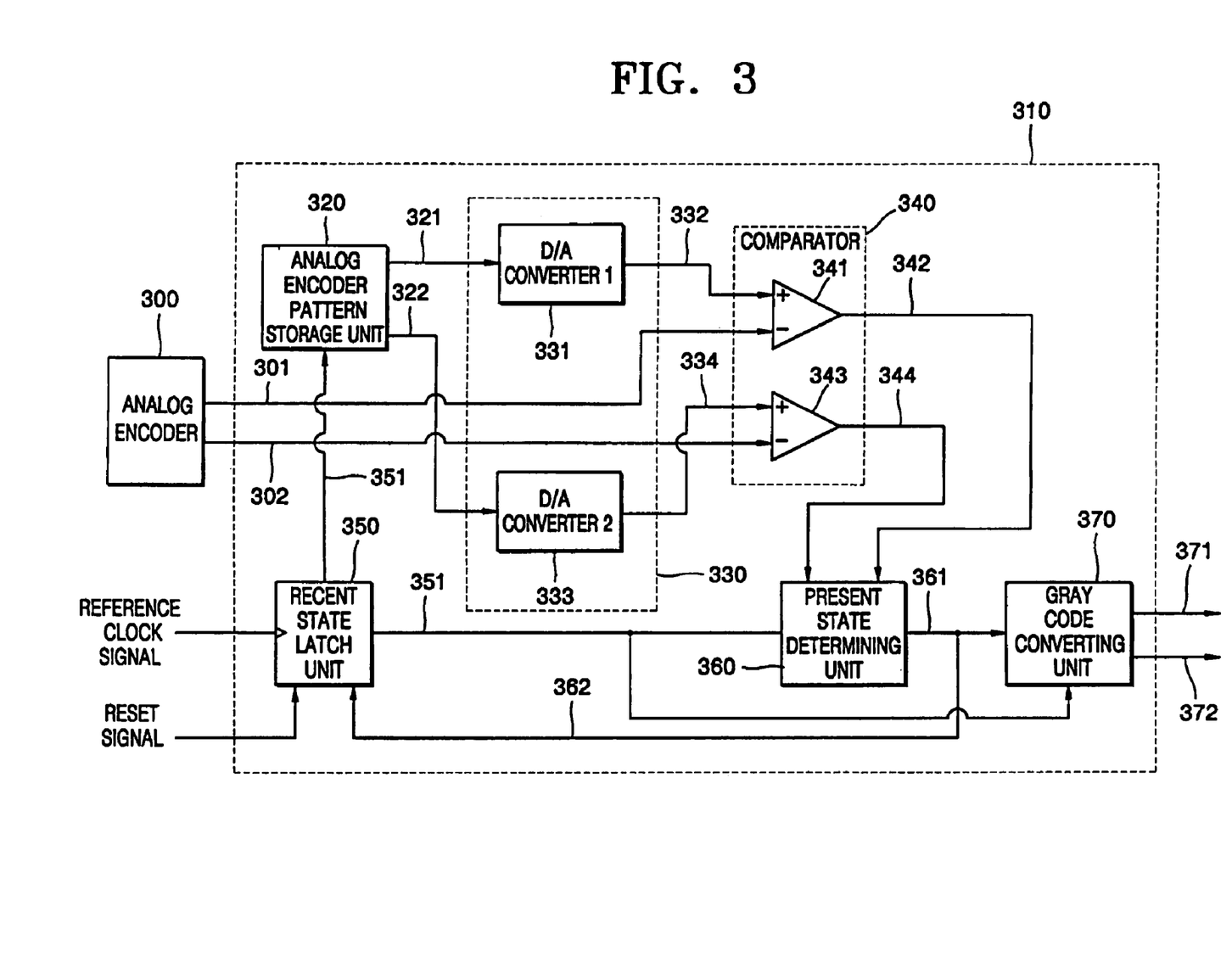
FIG. 3 is a block diagram of an embodiment of the analog encoder signal processing apparatus shown in FIG. 2.

FIG. 3 is a block diagram of an embodiment of the analog encoder signal processing apparatus shown in FIG. 2.

Referring to FIG. 3, the analog encoder signal processing apparatus 310 includes an analog encoder pattern storage unit 320, a digital/analog (D/A) converting unit 330, a comparator 340, a recent state latch unit 350, a present state determining unit 360, and a gray code converting unit 370. The D/A converting unit 330 includes a first converter 331 and a second converter 333, and the comparator 340 includes a first comparator 341 and a second comparator 343.

The analog encoder pattern storage unit 320 stores values obtained by sampling a first signal 301 and a second signal 302, which are output from an analog encoder 300 during initialization. Also, if a state is input from the recent state latch unit 350, the analog encoder pattern storage unit 320 samples and transfers the first and second signals 301 and 302 as sampled values 321 and 322 to the D/A converting unit 330.

Figure 6:
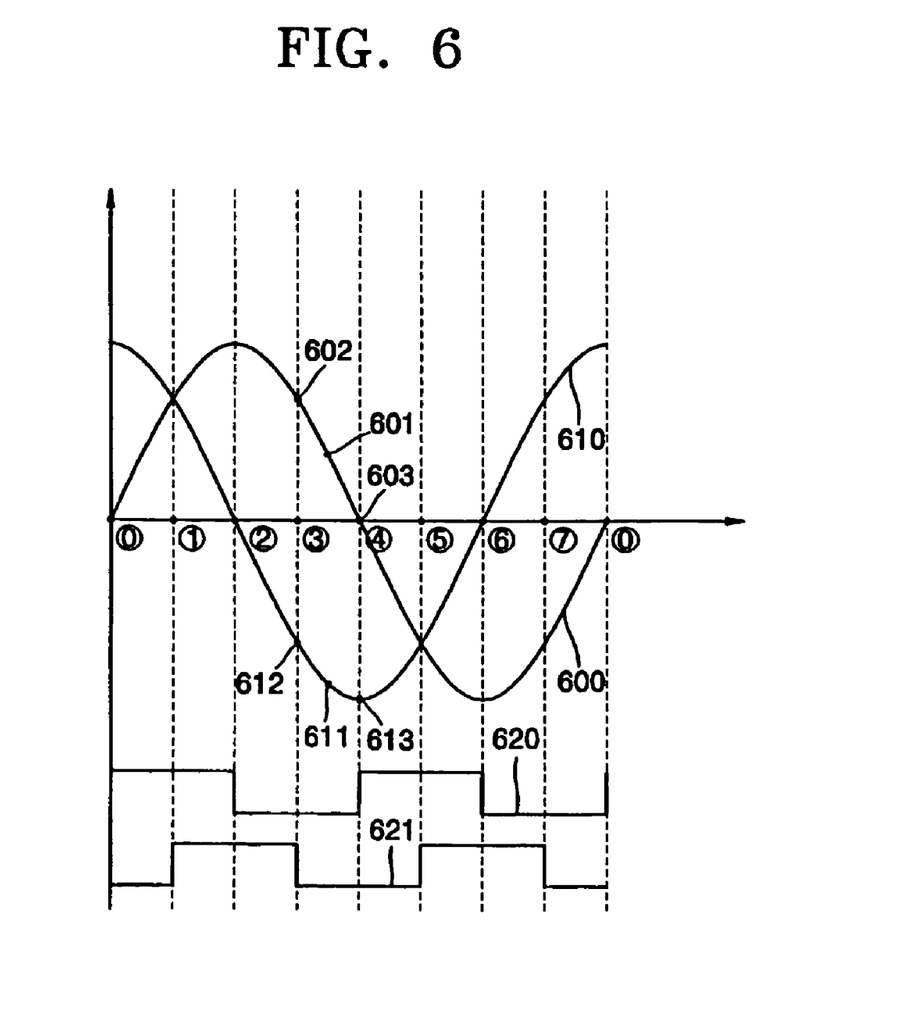
FIG. 6 is a waveform diagram to estimate a present estimated state based on a recent state.

In the embodiment of FIG. 3, since one period of a signal output from the analog encoder 300 is divided into 8 states (0–7) as shown in FIG. 6 which will be described later, the analog encoder pattern storage unit 320 stores 8 sampled values for each of the first and second signals 301 and 302. Although sinusoidal waves are illustrated in FIG. 6, the analog encoder 300 does not actually output any sinusoidal waves, but it is assumed for clarity of explanation that the outputs of the analog encoder 300 are sinusoidal waves.

The D/A converting unit 330 converts the sampled values read from the analog encoder pattern storage unit 320 into first and second analog signals 332 and 334 and outputs the first and second analog signals 332 and 334 to the comparator 340. As described above, the D/A converting unit 330 includes the first D/A converter 331 and the second D/A converter 333.

To be more specific, the first D/A converter 331 reads the first sampled value 321 from the analog encoder pattern storage unit 320 and converts the first sampled value 321 into the first analog sampled value 332, and the second converter 333 reads the second sampled value 322 from the analog encoder pattern storage unit 320 and converts the second sampled value 322 into the second analog signal 334.

The comparator 340 receives the first and second analog output signals 332 and 334 of the D/A converting unit 330 and the first and second signals 301 and 302 output from the analog encoder 300, compares them, and outputs positional change state information (PCSI) X_up and Y_up 342 and 344, which are digital signals represented by "1" and "0".

That is, the first comparator 341 compares the output signal 332 of the first D/A converter 331 with the first signal 301 of the analog encoder 300 and outputs a comparison result, i.e., positional change state information X_up 342 on the first signal 301.

Also, the second comparator 343 compares the second analog signal 334 output from the second D/A converter 333 with the second signal 302 output from the analog encoder 300 and outputs a comparison result, i.e., positional change state information Y_up 344 on the second signal 302.

The X_up and Y_up signals are positional change state information (PCSI), which are used along with recent state information to obtain a next state, i.e., a present estimated state.

The recent state latch unit 350 receives a present estimated state 362 output from the present state determining unit 360 and outputs the stored present estimated state 362 as a recent state 351 to the present state determining unit 360 in order to determine a next state. Then, in accordance with a reference clock signal, the recent state latch unit 350 transmits the present estimated state 362 output from the present state determining unit 360 to the analog encoder pattern storage unit 320. During initialization, a state of the recent state latch unit 350 is reset in response to a reset signal.

The present state determining unit 360 determines a next positional state (i.e., the present estimated state) based on the positional change state information X_up and Y_up 342 and 344 input from the comparing unit 340 and the recent state 351 input from the recent state latch unit 350. The determination of the next positional state will be described later with reference to FIGS. 6 and 7.

The gray code converting unit 370 converts state information 361 input from the present state determining unit 360 or the recent state latch unit 350 into gray codes and generates a first quadrature signal dX 371 and a second quadrature signal dY 372 from the converted gray codes. For this operation, the gray code converting unit 370 can store a lookup table (not shown) as exemplarily illustrated in Table 1, which sets up a relationship between gray codes and the quadrature signals dX and dY 371 and 372.

Instead of the gray code converting unit 370, the present state determining unit 360 may store state information codes including information on the quadrature signals 371 and 372 and generate the quadrature signals 371 and 372.

Table 1 illustrates examples of state information, state information codes, and quadrature signals corresponding thereto.

The quadrature signals corresponding to the gray codes are not limited to the present embodiment, but may be changed appropriately according to circumstances.

TABLE 1

| Examples of decimal state inf. | BCD code | State inf. code | Quadrature signals |
|---|---|---|---|
| 0 | 000 | 010 | 10 |
| 1 | 001 | 011 | 11 |
| 2 | 010 | 001 | 01 |
| 3 | 011 | 000 | 00 |
| 4 | 100 | 110 | 10 |
| 5 | 101 | 111 | 11 |
| 6 | 110 | 101 | 01 |
| 7 | 111 | 100 | 00 |

Figure 4:
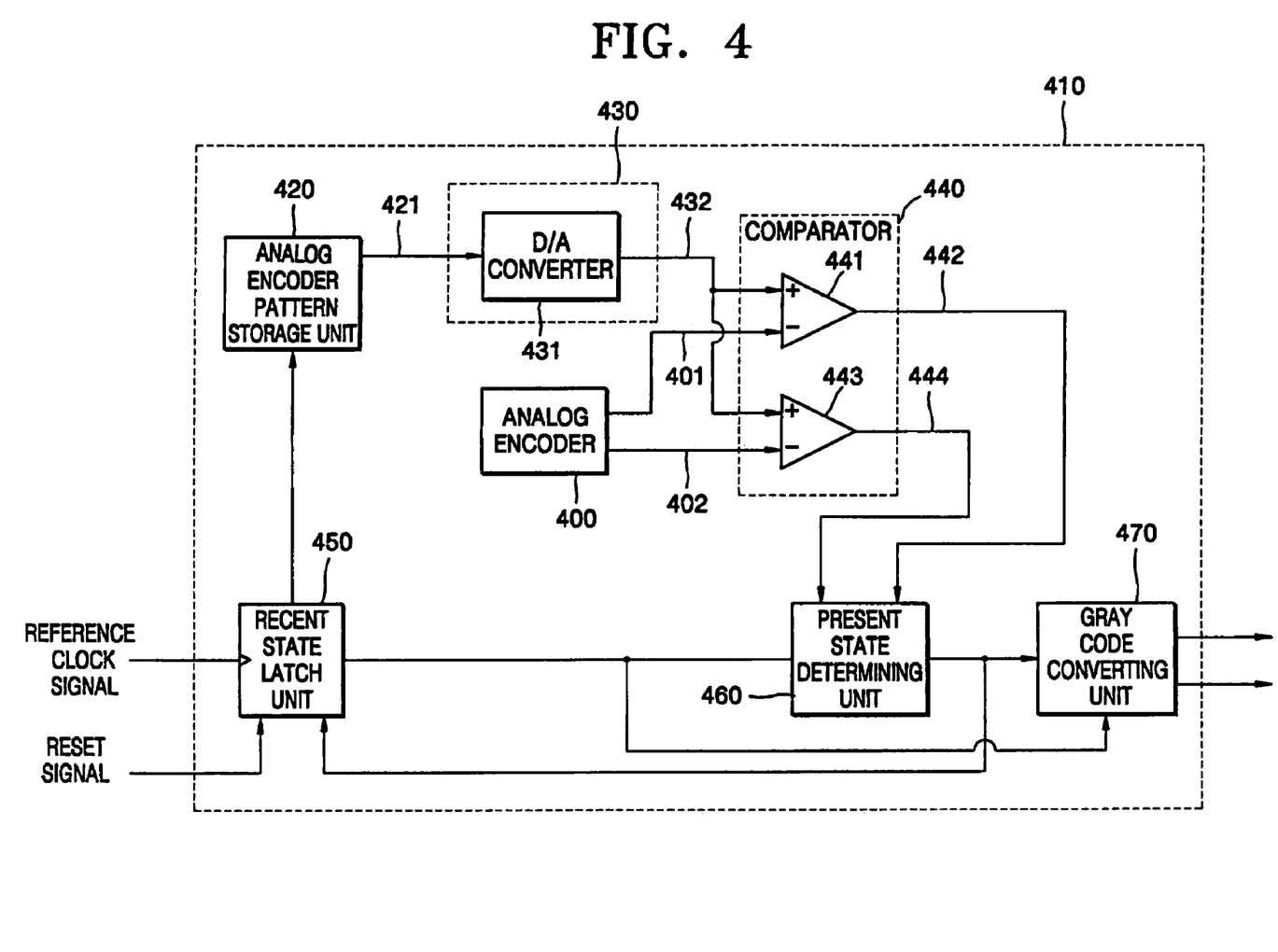
FIG. 4 is a block diagram of another embodiment of the analog encoder signal processing apparatus shown in FIG. 2.

FIG. 4 is a block diagram of an analog encoder signal processing apparatus according to another embodiment of the present general inventive concept.

The analog encoder signal processing apparatus shown in FIG. 4 includes an analog encoder pattern storage unit 420, a digital/analog converting unit 430, a comparator 440, a recent state latch unit 450, a present state determining unit 460, and a gray code converting unit 470.

In contrast with the digital/analog converting unit 330 in FIG. 3, the digital/analog converting unit 430 in FIG. 4 includes only one digital/analog converter 431. The analog encoder pattern storage unit 420 can store the channel data of a channel which is more sensitive to the positional change of the motor and information representing the sensitive channel. Therefore, the embodiment shown in FIG. 4 can accommodate a reduced size for the analog encoder pattern storage unit 420 and can be robust to noises. Furthermore, the number of the digital/analog converter, can also be reduced to one. The digital/analog converter 431 converts the output signal of the analog encoder pattern storage unit 420 into analog signals, and outputs the converted result to the comparator 440. Meanwhile, the digital/analog converter 431 converts a first or a second signal stored in the analog encoder pattern storage unit 420 to analog signals 432. Converted signals 432 are sent to the first comparator 441 and the second comparator 443. The number of the comparators can be reduced to one by using effective channel information stored in the analog encoder pattern storage unit 420 and a multiplexer.

Then, the comparator 440 receives the output 432 of the digital/analog converting unit 430 and output signals 401 and 402 from the analog encoder 400 and compares relative magnitudes between them to output a digitalized positional change state information X_up 442 and Y_up 444 which takes "1" and "0".

In contrast with the embodiment of FIG. 3, the analog encoder signal processing apparatus 410 in FIG. 4 only requires one digital/analog converter 431, and therefore a manufacturing cost and a power dissipation can be reduced.

The configurations and operations of the analog encoder pattern storage unit 420, comparator 440, recent state latch unit 450, present state determining unit 460, and gray code converting unit 470 are the same as those of the corresponding members shown in FIG. 3. Therefore, explanations thereof will be omitted for briefness of the specification.

The gray code converting unit 470 in FIG. 4 generates driving signals. The gray code, in this specification, is generated by a conversion from a single bit, and has a characteristic of reducing an error when used as an input code. Therefore, the gray code is frequently used in analog-digital converters and in input/output devices. However, the gray code converting unit 470 is used to generate quadrature signals with reduced conversion errors. That is, the gray code converting unit 470 can be replaced with a driving signal converting unit (not shown) which generates driving signals to drive the motor by using the present estimated state or the recent state. Furthermore, the driving signals can also be generated by using a predetermined look-up table which is configured using the present estimated state or the recent state.

Figure 5:
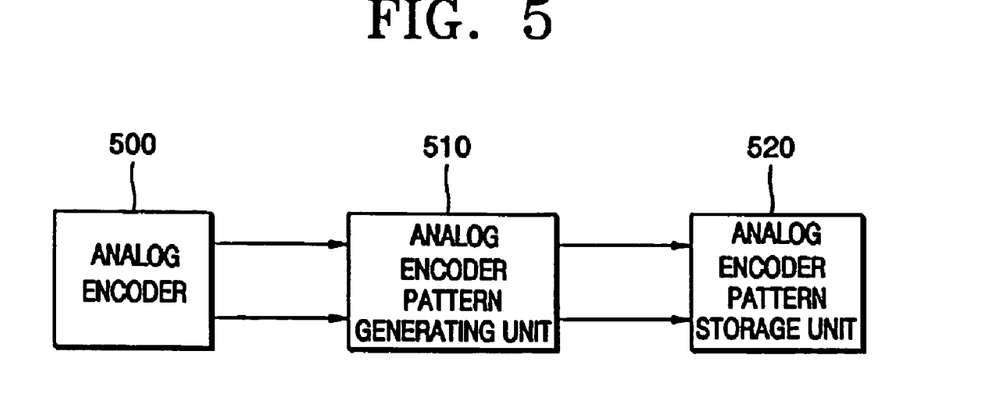
FIG. 5 illustrates a portion of the apparatus shown in FIG. 2, which patterns a quasi-sinusoidal wave analog signal output from an analog encoder during initialization.

FIG. 5 illustrates a portion of the apparatus shown in FIG. 2, which is used to pattern a quasi-sinusoidal wave analog signal output from the analog encoder 200 during initialization and includes an analog encoder 500, an analog encoder pattern generating unit 510, and an analog encoder pattern storage unit 520.

The analog encoder 500 is connected to an axis of a motor and rotated together with the motor, and outputs two quasi-sinusoidal wave signals, i.e., a first signal and a second signal, each of which has a predetermined number of periods per rotation of the analog encoder 200, by a phase difference of a predetermined angle.

The analog encoder pattern generating unit 510 divides one period of each of the signals into a predetermined number of states during initialization and samples the first and second signals output from the analog encoder 500. In the present embodiment, the period is divided into 8 states as shown in FIG. 6 so that the analog encoder pattern generating unit 510 may generate 8 converted digital values.

The analog encoder pattern storage unit 520 stores the converted digital values of the first and second signals that are generated in the analog encoder pattern generating unit 510 during the initialization.

A method of estimating a next state will be described with reference to FIG. 6. FIG. 6 is a waveform diagram to estimate a present estimated state based on a recent state according to an embodiment of the present general inventive concept. In FIG. 6, each of a first signal 600 and a second signal 610 is divided into 8 states.

For example, it is assumed that a first signal output from the analog encoder 200 of FIG. 2 is in a position 601 at present. Thus, a previous state of the first signal is 602, and a next state of the first signal is 603. Assuming that a second signal is in a position 611 at present, a previous state of the second signal is 612, and a next state of the second signal is 613.

Positional change state information X_up of the first signal 610 will now be determined. When the analog encoder rotates forward, a sampled value of the analog encoder in the recent state 602 is greater than that in the present state 601, and an output value of the first comparator 341 of FIG. 3 is 1.

Positional change state information Y_up of the second signal 600 will now be described. Since a sampled value of the analog encoder in the recent state 612 is greater than that in the present state 611, an output value of the second comparator 343 of FIG. 3 is also 1. Accordingly, if the analog encoder rotates forward, a next present estimated state would be 4.

In the same manner, if the analog encoder rotates backward, since positional change state information X_up and Y_up is both 0, a next present estimated state would be 3 as shown in the following Table 2. In Table 2, when positional change state information X_up and Y_up is 0 and 1, respectively or 1 and 0, respectively, the result is erroneous and thus not considered.

TABLE 2

| X_up | Y_up | Present estimated state |
|------|------|------------------------|
| 0 | 0 | 3 |
| 0 | 1 | X(Don't care) |
| 1 | 0 | X(Don't care) |
| 1 | 1 | 4 |

Figure 7:
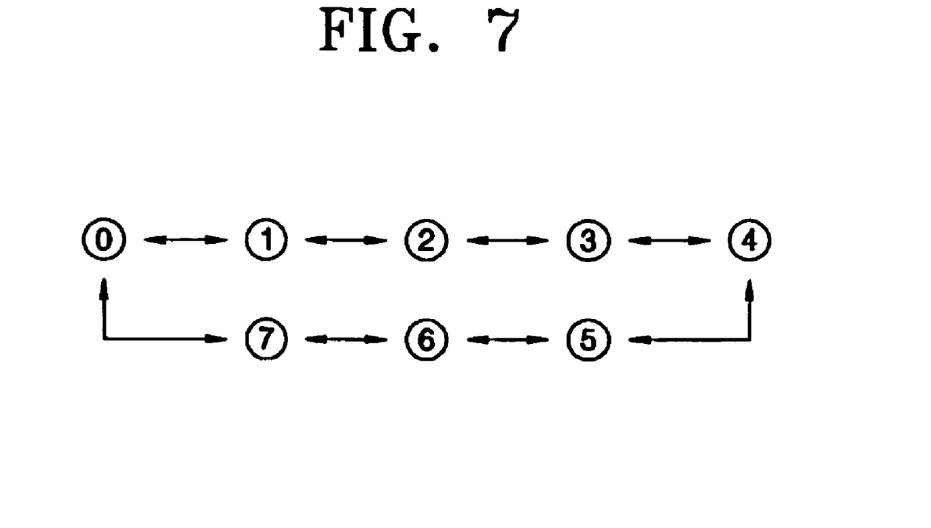
FIG. 7 illustrates a state transition of a signal output from an analog encoder according to the embodiment of FIG. 2.

FIG. 7 illustrates a state transition of a signal output from an analog encoder according to an embodiment of the present general inventive concept.

Referring to FIG. 7, a single period of a signal output from an analog encoder includes first through seventh states, each of which may be transitioned to only an adjacent state.

Figure 8:
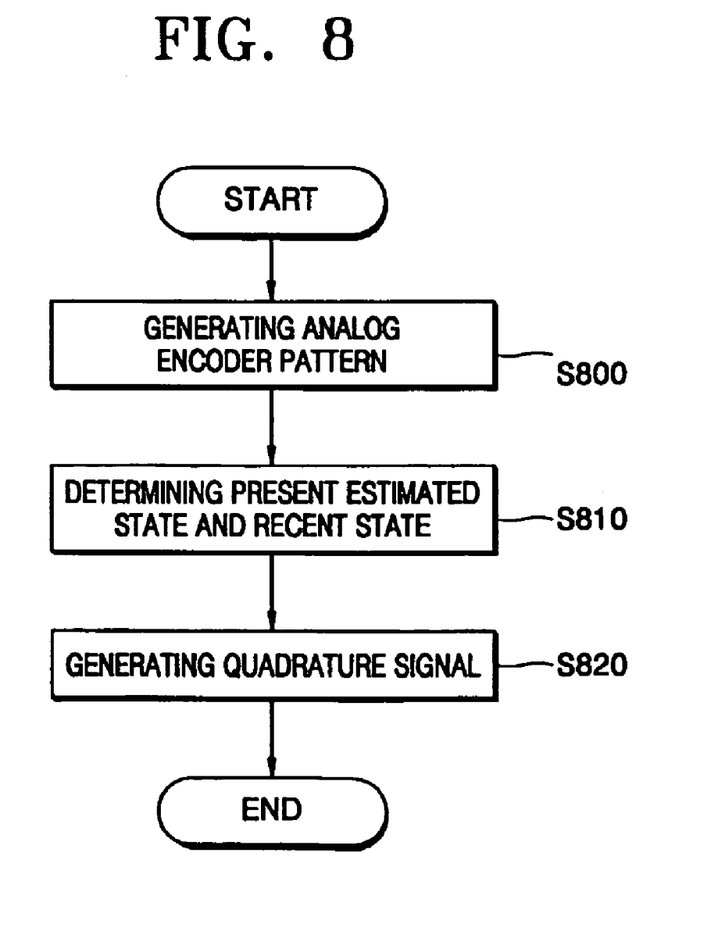
FIG. 8 is a flowchart illustrating a method of generating a quadrature signal according to an embodiment of the present general inventive concept.

FIG. 8 is a flowchart illustrating a method of generating a quadrature signal according to an embodiment of the present general inventive concept.

In operation S800, which is performed during initialization, one period of a signal is divided into a predetermined number of states, and a first signal 332 and a second signal 334, which are output from the analog encoder 300 of FIG. 3, are sampled. In the present embodiment, the period is divided into 8 states as shown in FIG. 6. Accordingly, the analog encoder pattern generating unit generates 8 sampled values for each of the first and second signals 332 and 334.

In operation S810, a recent state 351 and a present estimated state 362 are determined based on positional change state information X_up and Y_up of first comparator 341 and second comparator 343 output signals 342 and 344. A detailed flowchart of operation S810 is described in FIG. 9.

Figure 9:
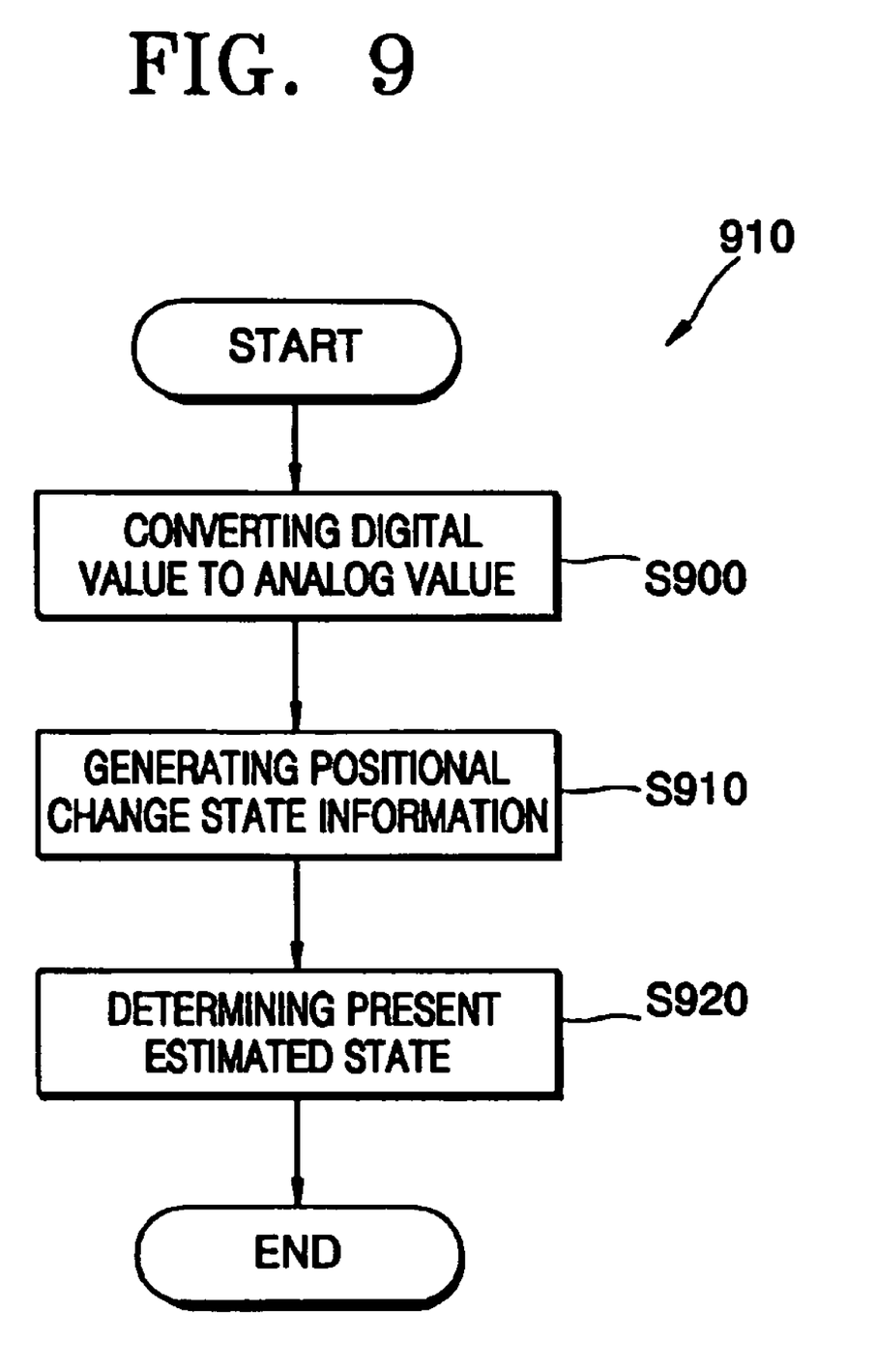
FIG. 9 is a detailed flowchart illustrating operation S810 shown in FIG. 8.

Referring to FIG. 9, if a state 352 (not shown) is input from the latch state latch unit (350 of FIG. 3), digital values of the first and second signals 301 and 302, which are stored in the analog encoder pattern storage unit (320 of FIG. 3), are converted into analog values in operation S900. To be more specific, the first D/A converter 331 converts a digital value 321 of the first signal into an analog value 332, and the second D/A converter 333 converts a digital value 322 of the second signal into an analog value 334.

In operation S910, the comparator 340 compares the first and second analog signals 332 and 334 output from the D/A converting unit 330 with the quasi-sinusoidal wave signals 301 and 302 output from the analog encoder 300, and outputs comparison results as "0" or "1". In other words, the first comparator 341 compares the first signal 332 output from the first D/A converter 331 with the quasi-sinusoidal wave signal 301 output from the analog encoder 300 to generate the positional change state information X_up 342. Also, the second D/A comparator 343 compares the second analog signal 334 output from the second D/A converter 333 with the quasi-sinusoidal wave signal 302 output from the analog encoder 300 to generate the positional change state information Y_up 344.

The positional change state information refers to signals output from the comparator 340. The positional change state information 342 on the first analog signal 332 is X_up, and the positional change state information 344 on the second analog signal 334 is Y_up.

In operation S920, the present state determining unit 360 receives the positional change state information 342 and 344 and determines a transitioned next state, i.e., a present estimated state 362, with reference to a lookup table, such as Table 1.

Referring again to FIG. 8, in operation S820, the gray code converting unit 370 generates quadrature signals based on the present estimated state 362. To be more specific, the gray code converting unit 370 receives the present estimated state 362 from the present state determining unit 360, converts the present estimated state 362 into gray codes, and generates quadrature signals dX and dY 371 and 372 based on the gray codes. For this operation, the gray code converting unit 370 may store a lookup table (not shown), which sets up a relationship between gray codes and the quadrature signals dX and dY 371 and 372, and Table 1 is an example of this lookup table.

In another embodiment of the present, a method of generating positional information by receiving an output signal fed back from an analog encoder is provided. The present embodiment includes the above-described operations S800 and 610 and further includes operation of calculating positional information.

Since operations S800 and S810 are described above, an explanation thereof will not be repeated here. Thus, only additional operation of calculating positional information will now be described.

The positional information (PI) means information on which of the forgoing 8 states a present position of a motor appertains to. This positional information (PI) refers to a state value of a recent state or a present estimated state. Although one period of a signal is divided into 8 states in the present invention, it would be apparent to those skilled in the art that a greater number of states than 8 can provide more exact positional information.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to process an analog encoder signal comprising an analog encoder and generating quadrature signals to control a position of a motor, the apparatus comprising:

an analog encoder pattern storage unit to store sampled analog encoder pattern generated from a fed-back output signal of the analog encoder and to transmit a value of the sampled analog encoder pattern corresponding to a recent state input from a recent state latch unit;

a comparator to compare the value of the sampled analog encoder pattern with an output signal of the analog encoder to generate positional change state information;

the recent state latch unit to latch a present estimated state transmitted from a present state determining unit with reference to a reference clock signal and to set the present estimated state as a recent state; and the present state determining unit determining a present estimated state based on the positional change state information and the recent state.

2. The apparatus of claim 1, further comprising a digital/analog converting unit to convert the value of the sampled analog encoder pattern read from the analog encoder pattern storage unit into an analog value and to output the result to the comparing unit.

3. The apparatus of claim 2, further comprising an analog encoder pattern generating unit to receive a first quasi-sinusoidal wave signal and a second quasi-sinusoidal wave signal, which are fed back from the analog encoder during initialization, to sample the first quasi-sinusoidal wave signal and the second quasi-sinusoidal wave signal, and to generate a sampled analog encoder pattern.

4. The apparatus of claim 3, further comprising a driving signal converting unit to convert the present estimated state or the recent state to driving signals to drive the motor.

5. The apparatus of claim 4, wherein the driving signals converting unit comprises a gray code converting unit to convert the present estimated state and the recent state into gray codes to generate quadrature signals.

6. The apparatus of claim 4, wherein the driving signals are generated by using a look-up table representing a relation of the present estimated state or the recent state to the driving signals.

7. The apparatus of claim 2, wherein the digital/analog converting unit converts the first and second quasi-sinusoidal output signals from the analog encoder pattern storage unit into analog signals and outputs the result to the comparing unit.

8. The apparatus of claim 7, wherein the digital/analog converting unit comprises:
   a first digital/analog converter to convert a sampled first quasi-sinusoidal wave signal input from the analog encoder pattern storage unit into an analog signal; and
   a second digital/analog converter to convert a sampled second quasi-sinusoidal wave signal input from the analog encoder pattern storage unit into an analog signal.

9. The apparatus of claim 8, wherein the comparing unit comprises:
   a first comparator to compare the first quasi-sinusoidal wave signal output from the first digital/analog converter with the first quasi-sinusoidal wave signal output from the analog encoder; and
   a second comparator comparing the second quasi-sinusoidal wave signal output from the first digital/analog converter with the second quasi-sinusoidal wave signal output from the analog encoder.

10. A method of processing an analog encoder signal, in which an analog quasi-sinusoidal wave signal output from an analog encoder is divided into a predetermined number of states, sampled, stored, and compared with an output signal of the analog encoder, a present estimated state is determined based on a recent state, and quadrature signals to control a motor are generated, the method comprising:
   generating an analog encoder pattern by sampling and quantizing a quasi-sinusoidal wave signal output from the analog encoder during initialization;
   determining a recent state and a present estimated state by comparing the analog encoder pattern with the quasi-sinusoidal wave signal; and
   generating the quadrature signals based on the recent state and the present estimated state.

11. The method of claim 10, wherein the generating of the analog encoder pattern comprises:
   generating an analog encoder pattern by sampling a quasi-sinusoidal wave signal and quantizing the sampled quasi-sinusoidal wave signal during initialization; and storing the analog encoder pattern.

12. The method of claim 10, wherein the determining of the recent state and the present estimated state comprises:
   converting the analog encoder pattern into an analog signal;
   generating positional change state information by comparing the converted analog signal with the quasi-sinusoidal wave signal output from the analog encoder; and
   determining a present estimated state based on the positional change state information and the recent state of the analog encoder.

13. The method of claim 10, wherein the generating of the quadrature signals comprises generating the quadrature signals based on the recent state and the present estimated state with reference to a lookup table.

14. The method of claim 10, wherein the generating of the quadrature signals comprises generating the quadrature signals based on a state information code including information on the quadrature signals.

15. The method of claim 10, wherein the calculating of the positional information of the motor comprises obtaining the positional information of the motor from state values of the recent state and the present estimated state.

16. An apparatus comprising:
   an analog encoder pattern storage unit;
   a recent state latch unit; and
   a present state determining unit to determine a present estimated state based on positional change state information and a recent state, wherein the determined present estimated state is fed-back to the recent state latch unit, and where the recent state latch unit latches the present estimated state as the recent state, received from the present state determining unit, and transfers the latched present estimated state information to the analog encoder pattern storage unit and the present state determining unit.

17. A method comprising:
   determining a present estimated state based on positional change state information and a recent state;
   providing the determined present estimated state as feedback to a recent state latch unit;
   receiving the present estimated state at the recent state latch unit;
   latching the present estimated state received from the present state determining unit as the recent state; and
   transferring the latched present estimated state information to an analog encoder pattern storage unit and a present state determining unit.

18. A method of generating signals used to drive a motor comprising:
   generating an analog encoder pattern by sampling and quantizing a quasi-sinusoidal wave signal output from the analog encoder during initialization;
   determining a recent state and a present estimated state by comparing the analog encoder pattern with the quasi-sinusoidal wave signal;
   generating quadrature signals based on the recent state and the present estimated state; and
   converting the present estimated state and the recent state to a binary code representation, wherein the binary code representation is obtained by using a lookup table to establish a relationship between the binary code and the quadrature signals.

* * * * *